United States Patent
Shih et al.

(10) Patent No.: US 9,448,605 B2
(45) Date of Patent: Sep. 20, 2016

(54) REDUNDANT POWER SUPPLY SYSTEM PROVIDING RAPID START OF BACKUP

(71) Applicant: ZIPPY TECHNOLOGY CORP., New Taipei (TW)

(72) Inventors: Tsun-Te Shih, New Taipei (TW); Yu-Yuan Chang, New Taipei (TW); Heng-Chia Chang, New Taipei (TW)

(73) Assignee: ZIPPY TECHNOLOGY CORP., New Taipei (TW)

(*) Notice: Subject to any disclaimer, the term of this patent is extended or adjusted under 35 U.S.C. 154(b) by 235 days.

(21) Appl. No.: 14/473,952

(22) Filed: Aug. 29, 2014

(65) Prior Publication Data

US 2016/0062431 A1 Mar. 3, 2016

(51) Int. Cl.
*G06F 1/00* (2006.01)
*G06F 1/26* (2006.01)
*G06F 9/44* (2006.01)

(52) U.S. Cl.
CPC .............. *G06F 1/266* (2013.01); *G06F 9/442* (2013.01)

(58) Field of Classification Search
None
See application file for complete search history.

(56) References Cited

U.S. PATENT DOCUMENTS

2009/0254768 A1* 10/2009 Livescu ................ G06F 1/3203
713/320

* cited by examiner

*Primary Examiner* — Kim Huynh
*Assistant Examiner* — Paul J Yen
(74) *Attorney, Agent, or Firm* — Muncy, Geissler, Olds & Lowe, P.C.

(57) ABSTRACT

A redundant power supply system providing rapid start of backup includes at least one primary power supply, at least one secondary power supply and a power integration panel. The secondary power supply includes a voltage regulation and energy saving element which has regulation potential after the secondary power supply being booted up. When the secondary power supply is triggered to shut down and the regulation potential is lower than a low voltage judgment criterion, it enters a standby working mode in which the secondary power supply is restarted for a transient working period to charge the voltage regulation and energy saving element. The power integration panel is electrically connected to the primary power supply and the secondary power supply, and inspects output status of the primary power supply and the secondary power supply in regular conditions to determine to boot up or shut down the secondary power supply.

7 Claims, 2 Drawing Sheets

REDUNDANT POWER SUPPLY SYSTEM PROVIDING RAPID START OF BACKUP

FIELD OF THE INVENTION

The present invention relates to a redundant power supply system and particularly to a redundant power supply system capable of starting backup rapidly.

BACKGROUND OF THE INVENTION

Technology industry at present usually has high demand on power supply stability. To meet this end a redundant power supply system has been developed. The redundant power supply system mainly includes a primary power supply, a secondary power supply for backup and a power integration panel. When power supply is started the power integration panel receives electric power output from the primary power supply and the secondary power supply to supply a load. The power integration panel further determines the output power supplied by the primary power supply and the secondary power supply according to energy consumption status of the connected load. In other words, energy consumption required by working of the load is shared and provided by the primary power supply and the secondary power supply. In the event that the primary power supply malfunctions incidentally, the power integration panel regulates and increases the output power of the secondary power supply to compensate the portion of power that cannot be provided by the primary power supply to meet working requirement of the load.

However, after the conventional redundant power supply system has been electrically energized and started, the primary power supply and the secondary power supply are at the started working state in regular conditions. But in practice the redundant power supply system is not at a rated full loading output working state for a prolonged duration. It also could be in a working condition of light load output. In the light load output working condition the secondary power supply is regulated by the power integration panel at a low output mode. In fact, at the light load output working condition the output power supplied by the primary power supply can meet the load requirement. But in industry at present, in order to make the secondary power supply always ready to supply electric power for backup, the secondary power supply is normally maintained at the activated state, but does not supply electric power. In fact the secondary power supply is at an idle state. Such a practice generates a great deal of unnecessary loss.

SUMMARY OF THE INVENTION

The primary object of the present invention is to provide rapid start of a secondary power supply and also resolve the problem of the conventional practice of making the secondary power supply at a boot up state for a prolonged duration that results in energy loss.

To achieve the foregoing object the present invention provides a redundant power supply system capable of starting backup rapidly. It includes at least one primary power supply, at least one secondary power supply and a power integration panel. The primary power supply receives external power and is triggered externally to boot up to transform the external power to output a primary working power. At boot up time, the primary power supply compares the primary working power output thereof based on an output comparison criterion and generates a first light load working parameter or a first heavy load working parameter. The secondary power supply receives the external power and is triggered externally to transform the external power to output a secondary working power. The secondary power supply includes a voltage regulation and energy saving element located in a power factor correction unit to do charging during boot up thereof and has a regulation potential. The secondary power supply also compares its output secondary working power based on the output comparison criterion to generate a second light load working parameter or a second heavy load working parameter, and also is triggered externally to shut down and compares the regulation potential based on a low voltage judgment criterion to provide a shutdown mode and a standby working mode. In the standby working mode the regulation potential is lower than the low voltage judgment criterion, and the secondary power supply is booted up for a short duration to enable the voltage regulation and energy saving element to receive electric power for charging to make the regulation potential higher than the low voltage judgment criterion, and shut down the secondary power supply after a transient working period. The power integration panel is electrically connected to the primary power supply and the secondary power supply, and receives the first light load working parameter, the first heavy load working parameter, the second light load working parameter or the second heavy load working parameter, and also has a first start mode by receiving the second light load working parameter from the secondary power supply to shut down the secondary power supply, and a second start mode by receiving respectively the first heavy load working parameter and the second heavy load working parameter from the primary power supply and the secondary power supply, and makes the secondary power supply to boot up and transform the external power to output the secondary working power.

In one embodiment the secondary power supply further includes a discharge voltage judgment criterion in the standby working mode. The discharge voltage judgment criterion is compared with the regulation potential. In the event that the regulation potential is higher than the discharge voltage judgment criterion, an isolation circuit in the secondary power supply is set on. If the regulation potential is lower than the discharge voltage judgment criterion, the isolation circuit is set off.

In another embodiment the secondary power supply includes a rectification filter unit connected to the power factor correction unit to get the external power, a transformer, a pulse width control unit, a switch element and a modulation output unit.

In yet another embodiment the secondary power supply further includes an energy saving control unit connected to the power factor correction unit and activated by the power integration panel and compares the regulation potential with the low voltage judgment criterion to determine whether the secondary power supply enters the shutdown mode or the standby working mode.

In yet another embodiment the secondary power supply further includes a second output status analysis unit which compares the secondary working power output from the secondary power supply based on the output comparison criterion at the boot up time of the secondary power supply to generate a second output state included the second light load working parameter and the second heavy load working parameter.

In yet another embodiment the power integration panel further includes a control unit which receives the first light load working parameter, the first heavy load working parameter, the second light load working parameter and the second heavy load working parameter, and determines the power integration panel to enter the first start mode or the second start mode.

Through the aforesaid structure, compared with the conventional techniques, the invention provides many advantageous features, notably:

1. The invention makes the backup secondary power supply not at a boot up state in regular conditions, hence can reduce energy consumption caused by the secondary power supply at the idle state.

2. The invention makes the secondary power supply which does not supplying power in the regulator conditions to start rapidly to provide power supply without waiting the regulation potential of the voltage regulation and energy saving element to become stable.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
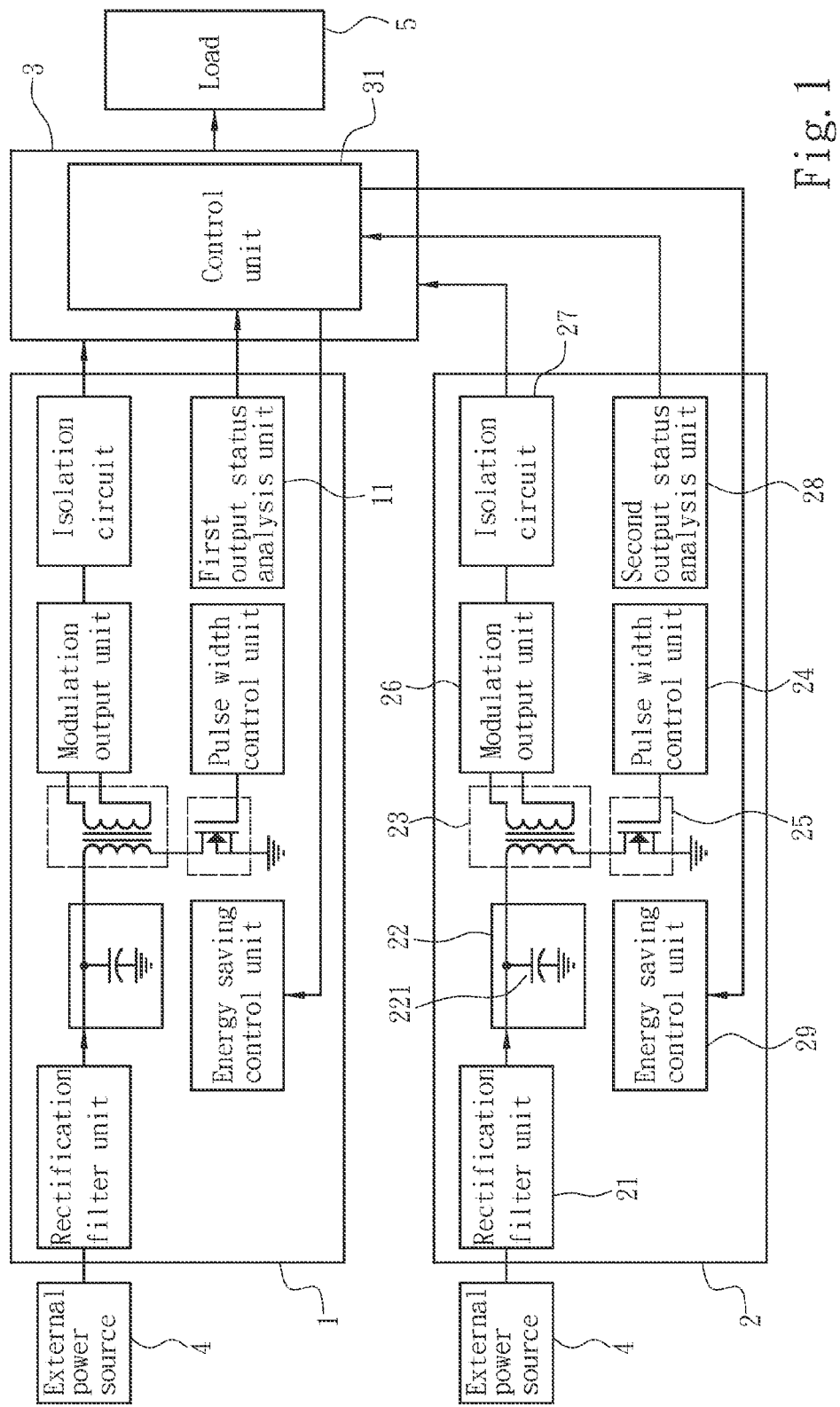
FIG. 1 is a block diagram of an embodiment of the redundant power supply system providing rapid start of backup according to the invention.
Figure 2:
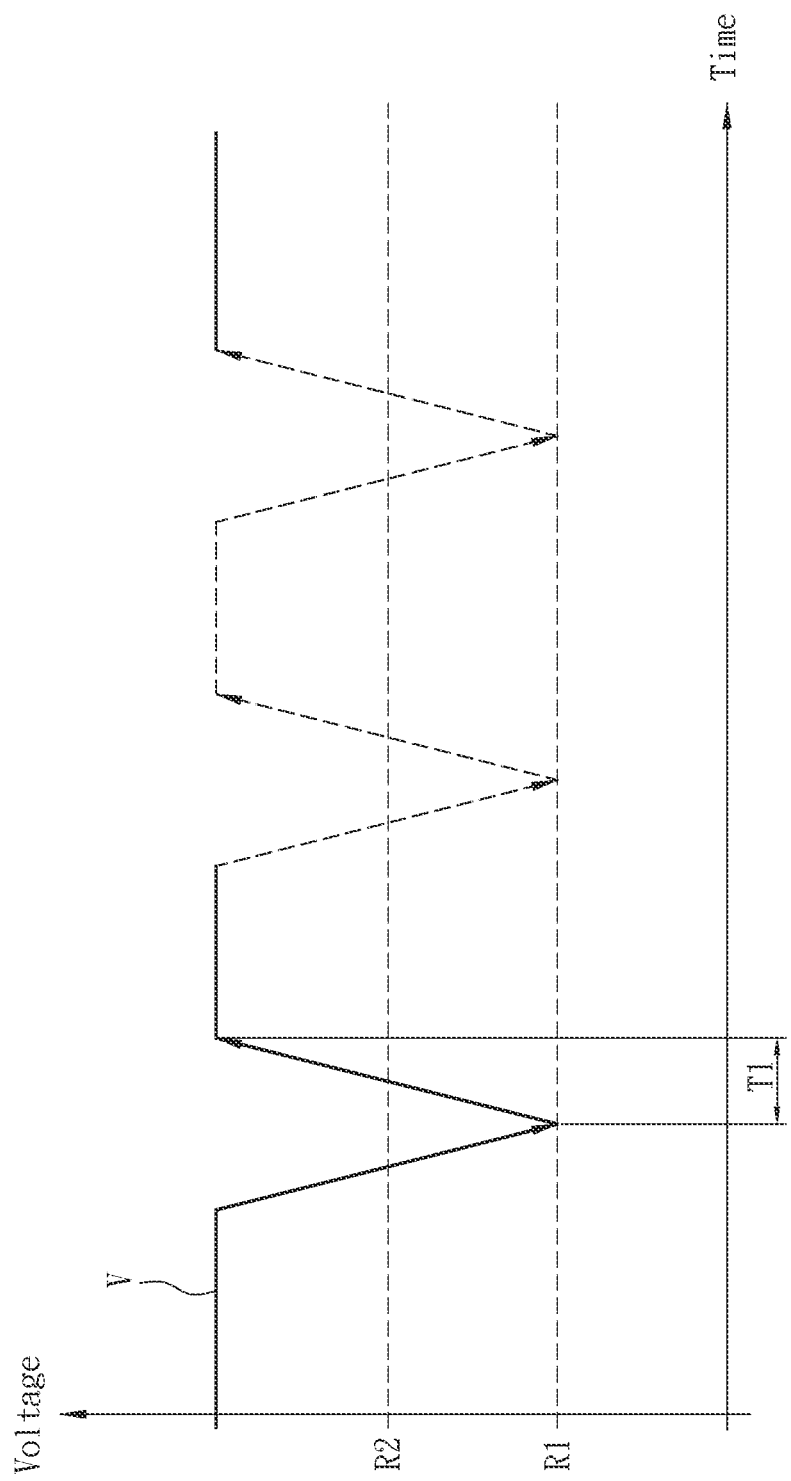
FIG. 2 is a schematic chart showing variation of regulation potential according to an embodiment of the redundant power supply system of the invention.

Please referring to FIGS. 1 and 2, the invention aims to provide a redundant power supply system that can start backup quickly. It includes at least one primary power supply 1, at least one secondary power supply 2 and a power integration panel 3. The primary power supply 1 and the secondary power supply 2 can include respectively a plurality of sets, and in practice can be made in a same structure. The following discussion takes only the secondary power supply 2 as an example. More specifically, the secondary power supply 2 includes a rectification filter unit 21, a power factor correction unit 22 connected to the rectification filter unit 21, a transformer 23, a pulse width control unit 24, a switch element 25 and a modulation output unit 26. When the secondary power supply 2 is triggered externally and boot up, the rectification filter unit 21 receives external power from an external power source 4 connected to the secondary power supply 2, and performs verification and filtering of the external power, then the power factor correction unit 22 changes the power factor of the external power through a voltage regulation level. The pulse width control unit 24 outputs a pulse width regulation signal to determine duty period of the switch element 25, and through the periodicity of the switch element 25 coil current of the transformer 23 can be set on or cut off. The modulation output unit 26 modulates electric power output from the transformer 23, and outputs a secondary working power to the power integration panel 3. Moreover, when the primary power supply 1 is triggered and started, it transforms the external power to a primary working power, and outputs the primary working power to the power integration panel 3.

Furthermore, the power factor correction unit 22 includes a voltage regulation and energy saving element 221 which can be a capacitor to include a regulation potential V after the secondary power supply 2 is energized with electricity.

Also referring to FIG. 2, when the secondary power supply 2 is triggered externally and shut down, it compares the regulation potential V based on a low voltage judgment criterion R1 and has a shutdown mode and a standby working mode. When the regulation potential V is higher that the low voltage judgment criterion R1, the secondary power supply 2 enters the shutdown mode in which the secondary power supply 2 continuously stops transformation of the external power, and makes the regulation potential V of the voltage regulation and energy saving element 221 to drop continuously. On the other hand, when the regulation potential V is lower than the low voltage judgment criterion R1, the secondary power supply 2 enters the standby working mode in which the secondary power supply 2 is booted up for a short duration to transform the external power, and the voltage regulation and energy saving element 221 gets power and is charged to make the regulation potential V higher than the low voltage judgment criterion R1, and after a transient working period T1 the secondary power supply 2 is shutdown. Moreover, in one embodiment the secondary power supply 2 further includes a discharge voltage judgment criterion R2 which can be compared with the regulation potential V. When the regulation potential V is higher than the discharge voltage judgment criterion R2, an isolation circuit 27 in the secondary power supply 2 is controlled and set on. When the regulation potential V is lower than the discharge voltage judgment criterion R2, the isolation circuit 27 is controlled and set off. Furthermore, the isolation circuit 27 is located on the circuitry of the secondary power supply 2 to output the secondary working power to the power integration panel 3. The isolation circuit 27 can be a controllable electronic switch aiming to avoid the power of the power integration panel 3 to enter the secondary power supply 2 when the secondary power supply 2 is in the standby working mode and the output end joined by the secondary power supply 2 and the power integration panel 3 is at a low voltage state. Moreover, the discharge voltage judgment criterion R2 has a potential criterion higher than that of the low voltage judgment criterion R1. In another embodiment the secondary power supply 2 further includes an energy saving control unit 29 which is connected to the power factor correction unit 22 and activated by the power integration panel 3 to compare with the regulation potential V to determine the secondary power supply 2 to enter the shutdown mode or the standby working mode.

Furthermore, the secondary power supply 2 further includes a second output status analysis unit 28 which, while the secondary power supply 2 is at the boot up state, regularly inspects at least one electrical characteristic (such as current value, voltage value) of the secondary working power output from the secondary power supply 2 to the power integration panel 3, and transforms the electric characteristic equivalently to a second light load working parameter or a second heavy load working parameter. The output comparison criterion mainly aims to judge the ratio of output power from the primary power supply 1 or the secondary power supply 2 in the total output of the redundant power supply system. For instance, presumed that the output comparison criterion is 50 watts, and the secondary working power output from the secondary power supply 2 is merely 30 watts, the second output status analysis unit 28 judges that it is a light load state, and outputs the second light load working parameter.

On the other hand, please referring to FIG. 1, the power integration panel 3 is connected to each primary power supply 1 and each secondary power supply 2. The primary power supply 1 and the secondary power supply 2 are triggered respectively and externally to boot up and start. The power integration panel 3 receives a first light load working parameter or a first heavy load working parameter from each primary power supply 1, and receives the second light load working parameter or the second heavy load working parameter from each secondary power supply 2. The power integration panel 3 has a first start mode to receive the second light load working parameter from the secondary power supply 2 to make the secondary power supply 2 to enter the standby working mode, and a second start mode to receive respectively the first heavy load working parameter and the second heavy load working parameter from the primary power supply 1 and the secondary power supply 2 to make the secondary power supply 2 to boot up and transform the external power and output the secondary working power. In addition, in yet another embodiment, the power integration panel 3 includes a control unit 31 to receive the first light load working parameter, the first heavy load working parameter, the second light load working parameter or the second heavy load working parameter to determine the power integration panel 3 to enter the first start mode or the second start mode. Moreover, the power integration panel 3 can also enter the first start mode or the second start mode through a load energy consumption criterion which is the first light load working parameter, the first heavy load working parameter, the second light load working parameter or the second heavy load working parameter that has been integrated and used for comparison. More specifically, in one embodiment, the primary power supply 1 generates the first heavy load working parameter, and the secondary power supply 2 generates the second light load working parameter, and after the power integration panel 3 has received the first heavy load working parameter and the second light load working parameter, it first performs integration, then makes comparison and judgment through the load energy consumption criterion, and determines to enter the first start mode or the second start mode.

More specifically, during implementation of the redundant power supply system of the invention the power integration panel 3 receives a start signal (Ps_on), and then starts boot up of the primary power supply 1 and the secondary power supply 2. After the primary power supply 1 is booted up, a first output status analysis unit 11 included therein outputs the first light load working parameter or the first heavy load working parameter, and the secondary power supply 2 outputs the second light load working parameter or the second heavy load working parameter. Presumed that the output comparison criterion of the redundant power supply system is 50 watts of output power as basis, in one embodiment the secondary power supply 2 outputs the secondary working power at 30 watts which is lower than the output comparison criterion, hence the secondary power supply 2 generates the second light weight working parameter; and the primary power supply 1 also has the primary working power at 30 watts, hence the primary power supply 1 generates the first light load working parameter. The control unit 31 of the power integration panel 3 receives the first light load working parameter and the second light load working parameter, and orders the secondary power supply 2 to shut down from boot up, and stop transformation of the external power. However, the shutdown secondary power supply 2 compares the low voltage judgment criterion R1 with the current regulation potential V of the voltage regulation and energy element 221, due to the secondary power supply 2 has stopped transformation of the external power, the voltage regulation and energy element 221 cannot get power, thus enters a discharge state, and the regulation potential V drops continuously. When the regulation potential V is lower than the low voltage judgment criterion R1, the secondary power supply 2 is ordered to start again for a short duration to transform the external power anew so that the voltage regulation and energy saving element 221 once again gets power to perform charging, and after the transient working period T1 (such as 120 ms) is over, the secondary power supply 2 is shut down again. Moreover, the power integration panel 3 provides electric power of corresponding power in the regular conditions upon request of the load 5. In the event that the load 5 remains continuously at a low energy consumption state, the power integration panel 3 makes the secondary power supply 2 to switch between the standby working mode and the shutdown mode in the regular conditions. Thus, the voltage regulation and energy saving element 221 of the secondary power supply 2 has electric charges saved therein in the regular conditions. When the power integration panel 3 is requested by the load 5 and requires output power from the secondary power supply 2, the secondary power supply 2 can quickly boot up to provide the secondary working power without waiting voltage regulation of the voltage regulation and energy saving element 221. In another embodiment, the secondary power supply 2 enters the standby working mode, and judges the regulation potential V based on the discharge voltage judgment criterion R2. In the event that the regulation potential V is lower than the discharge voltage judgment criterion R2, the isolation circuit 27 of the secondary power supply 2 is ordered to be set off so that the secondary power supply 2 is protected from being damaged by the external power entered from one end connected to the power integration panel 3.

As a conclusion, the redundant power supply system providing rapid start of backup according to the invention includes mainly at least one primary power supply, at least one secondary power supply and a power integration panel. The secondary power includes a voltage regulation and energy saving element which has a regulation potential after boot up and start. When the secondary power supply is triggered and shut down, and the regulation potential is lower than a low voltage judgment criterion, it enters a standby working mode in which the secondary power supply is restarted anew for a transient working period to charge the voltage regulation and energy saving element. The power integration panel is electrically connected to the primary power supply and the secondary power supply and inspects in regular conditions output status of the primary power supply and the secondary power supply to determine whether the secondary power supply to be booted up or shut down. Thereby the secondary power supply can be in the standby working mode in the regular conditions and be started quickly to reduce electric power consumption.

What is claimed is:

1. A redundant power supply system providing rapid start of backup, comprising:

at least one primary power supply which receives external power and is triggered externally to boot up to transform the external power to output a primary working power, and compares the primary working power based on an output comparison criterion at boot up time thereof to generate a first light load working parameter or a first heavy load working parameter;

at least one secondary power supply which receives the external power and is triggered externally to boot up to transform the external power to output a secondary working power, and includes a voltage regulation and energy saving element in a power factor correction unit to perform charging and include a regulation potential, the secondary power supply comparing the secondary working power based on the output comparison criterion at boot up time thereof to generate a second light load working parameter or a second heavy load working parameter, and comparing the regulation potential based on a low voltage judgment criterion when triggered externally to shut down to get a shutdown mode and a standby working mode; in the standby working mode the secondary power supply being booted up for a short duration when the regulation potential is lower than the low voltage judgment criterion to charge the voltage regulation and energy saving element to make the regulation potential higher than the low voltage judgment criterion, and the secondary power supply being shut down when a transient working period is over; and a power integration panel which is electrically connected to the primary power supply and the secondary power supply, and includes a first start mode to receive the second light load working parameter from the secondary power supply to shut down the secondary power supply, and a second start mode to receive the first heavy load working parameter and the second heavy load working parameter respectively from the primary power supply and the secondary power supply so that the secondary power supply is booted up to transform the external power and output the secondary working power.

2. The redundant power supply system of claim 1, wherein the secondary power supply in the standby working mode further includes a discharge voltage judgment criterion which is compared with the regulation potential such that an isolation circuit of the secondary power supply is set on when the regulation potential is higher than the discharge voltage judgment criterion, and set off when the regulation potential is lower than the discharge voltage judgment criterion.

3. The redundant power supply system of claim 1, wherein the secondary power supply includes a rectification filter unit which receives the external power and is connected to the power factor correction unit, a transformer, a pulse width control unit, a switch element and a modulation output unit.

4. The redundant power supply system of claim 3, wherein the secondary power supply further includes an energy saving control unit which is connected to the power factor correction unit and activated by the power integration panel and compares the regulation potential with the low voltage judgment criterion to determine the secondary power supply to enter the shutdown mode or the standby working mode.

5. The redundant power supply system of claim 1, wherein the secondary power supply further includes an energy saving control unit which is connected to the power factor correction unit and activated by the power integration panel and compares the regulation potential with the low voltage judgment criterion to determine the secondary power supply to enter the shutdown mode or the standby working mode.

6. The redundant power supply system of claim 1, wherein the secondary power supply further includes a second output status analysis unit to compare the output secondary working power based on the output comparison criterion at the boot up time of the secondary power supply to generate the second light working parameter and the second heavy working parameter.

7. The redundant power supply system of claim 1, wherein the power integration panel further includes a control unit to receive the first light load working parameter, the first heavy load working parameter, the second light load working parameter or the second heavy load working parameter to determine the power integration panel to enter the first start mode or the second start mode.

* * * * *